United States Patent [19]

Colchester et al.

[11] 3,864,352

[45] Feb. 4, 1975

[54] MANUFACTURE OF BIPYRIDYLIUM SALTS

[75] Inventors: John Edward Colchester; John Francis Cairns; John Gerard Carey, all of Runcorn, England

[73] Assignee: Imperial Chemical Industries Limited, Millbank, London, England

[22] Filed: Dec. 5, 1969

[21] Appl. No.: 882,701

[30] Foreign Application Priority Data
Dec. 23, 1968 Great Britain............... 61010/68

[52] U.S. Cl.................. 260/295 AM, 260/296 D
[51] Int. Cl........................................ C07d 31/44
[58] Field of Search ............... 260/296 D, 295 AM

[56] References Cited
UNITED STATES PATENTS
3,405,135  10/1968  Colchester et al............. 260/296 D Primary Examiner—Alan L. Rotman
Attorney, Agent, or Firm—Cushman, Darby & Cushman

[57] ABSTRACT

A process for the manufacture of a 1,1'-disubstituted-4,4'-bipyridylium salt which comprises treating the corresponding 1,1'-disubstituted-1,1'-4,4'-tetrahydro-4,4'-bipyridyl with an organic compound which has a redox potential in water more positive than −1.48 volts as compared with the saturated calomel electrode and which accepts a hydride ion to form an anion which under the conditions of the reaction has a redox potential more negative than −0.45 volts as compared with the saturated calomel electrode, and subsequently oxidizing the resulting interaction product.

19 Claims, No Drawings

MANUFACTURE OF BIPYRIDYLIUM SALTS

This invention relates to the manufacture of bipyridylium salts and particularly to a process for the manufacture of 1,1'-disubstituted-4,4'-bipyridylium salts which are useful herbicides by oxidation of the corresponding 1,1'-disubstituted-1,1',4,4'-tetrahydro-4,4'-bipyridyl.

In U.K. Patent Specification No. 1,073,081 we have described and claimed a process for the production of an N,N'(or 1,1'-) disubstituted-4,4'-bipyridylium salt by treating an N,N'-disubstituted-tetrahydrobipyridyl with an oxidising agent that is an organic compound which is a hydrogen acceptor and which has a redox potential in an aqueous system more positive than -1.48 volts with respect to the saturated calomel electrode.

We have now found that a number of organic compounds can oxidise tetrahydrobipyridyls to yield intermediate oxidation products which are readily further oxidisable, for example by means of air, to bipyridylium salts. These intermediate oxidation products are 1,1'-disubstituted-1,1'-dihydro-4,4'-bipyridyls and we have found that suitable organic oxidising agents for forming them are agents which have a redox potential in an aqueous system more positive than -1.48 volts with respect to the saturated calomel electrode and which accept a hydride ion (H⁻) to form an unstable anion.

Oxidation of the tetrahydrobipyridyl is believed to occur initially by transfer of a hydride ion (H⁻) therefrom to the oxidising agent to form an anion. Further oxidation of the tetrahydrobipyridyl to a dihydrobipyridyl could then occur by transfer of a proton (H⁺) from the product of the initial oxidation to the anion formed in the initial oxidation. The overall reaction is therefore believed to be a concerted ionic elimination of hydrogen. The intermediate anion is capable of effecting the transfer of a proton from the product of the initial oxidation and for the purposes of this specification is called an unstable anion. An alternative definition is that the anion is not able to be stabilised under the conditions of the reaction by a bipyridylium cation; such anions have a redox potential under the conditions of the reaction more negative than -0.45 volts with respect to the saturated calomel electrode.

According to the present invention we provide a process for the manufacture of a 1,1'-disubstituted-4,4'-bipyridylium salt which comprises treating the corresponding 1,1'-disubstituted-1,1',4,4'-tetrahydro-4,4'-bipyridyl with an organic compound which has a redox potential in water more positive than -1.48 volts as compared with the saturated calomel electrode and which accepts a hydride ion to form an anion which under the conditions of the reaction has a redox potential more negative than -0.45 volts with respect to the saturated calomel electrode, and subsequently oxidising the resulting interaction product.

The reaction may be carried out conveniently in solution, usually in a solvent which will dissolve the N,N'-disubstituted tetrahydrobipyridyl and preferably also the oxidising agent. Suitable solvents include ethers, for example diethyl ether, tetrahydrofuran, 1,2-dimethoxy ethane, bis-(2-methoxyethyl) ether, and 1,4-dioxane; ketones, for example acetone; nitro compounds, for example nitroalkanes; nitriles, hydrocarbons, for example benzene and hexane; organic bases, for example pyridine; halogenated hydrocarbons, particularly chlorinated hydrocarbons, for example chlorobenzene, chloroform and trichloroethylene; amides, particularly tertiary alkylamides for example dimethyl formamide; sulphoxides, for example dimethyl sulphoxide; sulphones for example sulfolane; and propylene carbonate. Although their use tends to somewhat lower yields of bisquaternary salts than can be obtained with the above-mentioned solvents, the reaction may also be carried out in other solvents if desired, for example in alcohols (including glycols) for example ethylene glycol, diethylene glycol, methanol, 2-(2-methoxy ethoxy) ethanol, and isopropanol. Mixtures of such solvents may be used if desired.

The N,N'-disubstituted tetrahydro-4,4'-bipyridyl may be in particular an N,N'-dialkyl-tetrahydro-4,4'-bipyridyl, in which case our selected oxidising agents are especially useful in giving good yields which are not obtainable with other oxidising agents. The N,N'-dialkyl tetrahydrobipyridyl may be made in known manner for example by reducing an aqueous solution of an N-alkyl pyridinium salt (for example N-methyl pyridinium iodide) with sodium amalgam or by electrolytic reduction. Alternatively it may be made by treatment of the sodium derivative of tetrahydrobipyridyl with an alkyl halide. The process may also be applied to tetrahydro-4,4'-bipyridyls having a variety of other N-substituents, for example benzyl groups. In the case of 1,1'-dialkyl tetrahydrobipyridyls the alkyl groups advantageously contain from 1 to 6 carbon atoms.

There may also be used, in particular, those tetrahydrobipyridyls having as N-substituents a carbamidoalkyl group, especially an N,N-disubstituted carbamidomethyl group. Such tetrahydrobipyridyls may be obtained by electrolytic reduction of the corresponding N-substituted pyridinium salt, as is more fully described in U.K. Patent Specification No. 1,073,082. The bipyridylium salts produced from these compounds may be made alternatively be reacting an N,N-disubstituted amide of a halogenated aliphatic monocarboxylic acid (especially an N,N-disubstituted chloroacetamide) with 4,4'-bipyridyl. The carbamidoalkyl groups are of the structure $-R_1-CO-NR_2R_3$ in which $R_1$ is a hydrocarbon radical (usually a methylene group $-CH_2-$) and $R_2$ and $R_3$ are hydrocarbon or substituted hydrocarbon radicals, especially alkyl groups of 1 to 4 carbon atoms; the group $R_2$ and $R_3$ may, together with the attached nitrogen atom, form a heterocyclic ring (for example a piperidine or morpholine ring) which may optionally be substituted.

In the tetrahydrobipyridyls the pyridyl nuclei may be unsubstituted or they may be substituted for example by alkyl groups, in the 2, 3, 5 or 6-positions.

The reaction may be carried out conveniently at ambient temperatures, though higher or lower temperatures may also be used if desired, for example from 0°C to 200°C, preferably from 50° to 120°C. The particular reaction conditions to be employed in any particular instance will, of course, depend to some extent upon the particular reactants and solvent employed and can be determined by simple experiment.

The concentration of the tetrahydrobipyridyl is not critical and we have found that a concentration of about 0.5 mole per litre is satisfactory. For optimum results the amount of the oxidising agent should be such that the molar ratio of the oxidising agent to the tetrahydrobipyridyl is at least 1:1 and an excess of the oxidising agent will normally be employed. Conveniently the oxidising agent can be employed as a solution in which case the concentration of the agent can be suitably about 0.5 mole per litre. A particularly suitable technique is to add a solution of the oxidising agent of concentration about 0.5 mole per litre to a solution of the tetrahydrobipyridyl also of concentration about 0.5 mole per litre.

Any organic compound can be used which has the specified redox potential and which accepts a hydride ion to form an unstable anion. Suitable compounds include organic monoketones and diketones and olefinic compound containing an activated double bond. Amongst suitable monoketones there may be mentioned in particular compounds of formula R—C(=O)—R$_1$ wherein R represents an aromatic group and R$_1$ represents an aromatic, cycloaliphatic, alkyl, aryl, alkaryl or aralkyl group. Examples of suitable compounds of this type are acetophenone and substituted acetophenones wherein the substituent is an aryl group i.e. compounds of formula Ar—(C=O)—CH$_3$; in particular the aryl group may be a phenyl group and especially a benzyl group which contains a substituent such as a hydroxy group in the o-position, for example o-hydroxy benzalacetophenone. A further example of a useful compound is benzal acetone.

As diketones which can be used there may be mentioned in particular those of the formula R—C(=O)+C-(=O)—R$_1$ wherein R and R$_1$ may be the same or different and each represents an alkyl, aryl, aralkyl, alkaryl or cycloaliphatic group. Examples of suitable compounds of this type are benzil and diacetyl.

Suitable organic compounds containing an activated double bond include those wherein the double bond is activated by virtue of being adjacent to a carbon atom bearing as substituent an electron-withdrawing group such as a halide atom or an oxygen atom in the form of a carbonyl group. Particularly suitable compounds of this type are benzylidene acetophenone, o-hydroxy benzylidene acetophenone, diethyl maleate and cinnamaldehyde.

A still further type of organic compound which may be used is a heterocyclic compound having two hetero-atoms wherein the hetero-atom, e.g. a nitrogen atom, readily accepts hydride ions and protons, for example phenazine, acridine, pyrazine and azobenzene.

The interaction product of the tetrahydrobipyridyl and the organic oxidising agent can be readily oxidised (without being isolated from the reaction mixture) to the corresponding 1,1'-disubstituted bypyridylium salt by means of oxygen or air or a variety of oxidising agents. Any oxidising agent can be used which has a redox potential in water more positive than −0.50 volts with respect to the saturated calomel electrode and which is an electron acceptor and examples of suitable inorganic oxidising agents are ceric sulphate, preferably in an acidic medium; metal salts, especially halide salts; the inorganic oxyacid anhydrides, especially sulphur dioxide and sulphur trioxide; and air or oxygen in conjunction with water, carbon dioxide and/or acetic acid. Air or oxygen itself may be used to effect the oxidation. Organic oxidising agents, for example quinones such as benzoquinone, chloranil and anthraquinone may also be used, as may mixtures of oxidising agents.

The 1,1'-disubstituted bipyridylium salts can be recovered from the reaction mixture by conventional processes, for example by extraction of the mixture with water or with a dilute solution of an acid such as sulphuric, hydrochloric, phosphoric or acetic acid. The aqueous phase is then separated from the organic phase and the bipyridylium salt is recovered from the aqueous phase by evaporation of the water and crystallisation of the salt.

The process of our invention has the advantages of providing very useful yields of bis-quaternary salts, as high as 80 percent or more of theory. It also has the advantage that it enables different salts to be prepared at will by use of the appropriate acid in the final stage; this provides a simple route to salts which are less corrosive than the chlorides which are usually the most accessible ones by the processes formerly available.

The invention is illustrated but in no way limited by the following Examples:

EXAMPLES 1 to 5

A solution of N,N'-dimethyl tetrahydrobipyridyl (0.0156 mole) in toluene (50 mls) was added to a solution of benzylidene acetophenone (0.02 mole) in toluene (75 mls) under an atmosphere of nitrogen. An immediate reaction occurred during which the solution developed a red colouration. This solution was warmed to 80°C for 5 hours and was then cooled. To the cooled solution (25° C) which contained N,N'-dimethyl-dihydro-4,4'-bipyridyl was added a 4 percent aqueous solution of acetic acid, and air was blown through the mixture until the organic phase became colourless (ca. 5 minutes). The aqueous phase was separated and was shown by spectrophotometric and polarographic analysis to contain 1.06 gms of N,N'-dimethyl-4,4'-bipyridylium cation (37 percent efficiency).

The above procedure was repeated 4 times but using solutions of the oxidising agents in the solvents shown in Table 1 instead of the solution of benzylidene acetophenone in toluene.

Table 1

| Example No. | Oxidising Agent | Solvent | Time (hrs) | Reaction Efficiency (%) |
|---|---|---|---|---|
| 1 | benzylidene acetophenone | toluene | 5 | 37 |
| 2 | biacetyl | benzene | 2 | 20 |
| 3 | benzil | benzene | 4 | 14 |
| 4 | o-hydroxy acetophenone | toluene | 4 | 10 |
| 5 | phenazine | toluene | 4 | 15 |

In each example a sample of the red solution prior to admitting air was analysed spectrophotometrically and in each case the presence of 1,1'-dimethyl-1,1'-dihydrobipyridyl was indicated by an intense peak at 400 m$\mu$ and a shoulder at 374 m$\mu$ in the ultra-violet spectrum. On admitting air to the red solution, this immediately turned blue in each example.

EXAMPLE 6

A solution of 1,1'-dimethyl-1,1',4,4'-tetrahydro-4,4'-bipyridyl (0.015 mole) in benzene (50 mls) was added dropwise over a period of 1 hour to a stirred solution of phenazine (0.04 mole) in benzene (75 mls) at 80°C under an atmosphere of nitrogen. The resulting mixture was stirred at 80°C for a further 3 hours to yield a deep red solution containing 1,1'-dimethyl dihydro-4,4'-bipyridyl (ultra-violet spectrum). The red solution was cooled to 0°C in a bath of ice after which aqueous acetic acid (100 mls of 3 percent acid) was added and air was blown through the mixture.

The aqueous phase was separated and was found by analysis to contain 1,1'-dimethyl-4,4'-bipyridylium cation, representing an efficiency of 72 percent in respect of the dihydrobipyridyl based on the tetrahydrobipyridyl fed (assuming 100 percent conversion of the dihydrobipyridyl to the bipyridylium salt).

The organic phase after separation was evaporated to reduced volume and crystals of a complex of phenazine and N,N'-dihydrophenazine (1:1 molecular complex — purple needle-shaped crystals) were obtained, of melting point 208°-210°C. The crystals were treated with dilute aqueous acetic acid and oxygen and phenazine (0.038 mole) was obtained, corresponding to a recovery efficiency of 95 percent. The aqueous phase was found to contain hydrogen peroxide.

EXAMPLES 7 to 21

These examples illustrate the use of a variety of organic oxidising agents. The experimental procedure in examples 7–17 was as follows:

A solution of N,N'-dimethyl tetrahydro-4,4'-bipyridyl (0.0156 mole) in benzene (50 mls) was added dropwise over a period of 1 hour under an atmosphere of nitrogen to a stirred solution of the oxidising agent (0.05 mole) in benzene (75 mls) and the mixture was heated under reflux for a few hours (see the Table below). After this time the resulting deep red solution was cooled to 0°C and aqueous buffer solution (pH 7—150 mls) was added. Air was then blown through the cooled solution.

The aqueous phase was separated and was analysed spectrophotometrically. In each example 1,1'-dimethyl-4,4'-bipyridylium cation was identified and its amount was determined.

The experimental procedure in example 18 was the same as in examples 7–17 except that toluene was employed as the solvent instead of benzene.

The experimental procedure in examples 19–21 was the same as in examples 7–17 except that the mixture was maintained at 20°C instead of being heated at the reflux temperature.

The results are shown in Table 2 below in which the reaction efficiency (%) is in respect of the bipyridylium salt based on the tetrahydrobipyridyl fed and time is after the final addition of the solution of the tetrahydrobipyridyl.

Table 2

| Example No. | Oxidising Agent | Time (hrs) | Temp. (°C) | Efficiency (%) |
| --- | --- | --- | --- | --- |
| 7 | benzal acetophenone | 5 | 80 | 36 |
| 8 | benzal acetone | 4 | 80 | 3 |
| 9 | o-hydroxy benzal acetophenone | 5 | 80 | 19 |
| 10 | benzil | 5 | 80 | 13 |
| 11 | benzal aniline | 4 | 80 | 7 |
| 12 | diethyl maleate | 4 | 80 | 5 |
| 13 | dibenzophenazine | 4 | 80 | 37 |
| 14 | phenazine | 4 | 80 | 75 |
| 15 | acridine | 4 | 80 | 38 |
| 16 | quinoxaline | 4 | 80 | 8 |

Table 2-Continued

| Example No. | Oxidising Agent | Time (hrs) | Temp. (°C) | Efficiency (%) |
| --- | --- | --- | --- | --- |
| 17 | pyrazine | 4 | 80 | 6 |
| 18 | o-hydroxyacetophenone | 4 | 110 | 10 |
| 19 | benzal acetophenone | 72 | 20 | 6 |
| 20 | o-hydroxy benzal acetophenone | 72 | 20 | 16 |
| 21 | cinnamaldehyde | 4 | 20 | 8 |

What we claim is:

1. A process for the manufacture of a 1,1' lower alkyl or carbamido lower alky-disubstituted-4,4'-bipyridylium salt which comprises forming the corresponding 1,1'-disubstituted-1,1'-dihydro-4,4'-bipyridyl by treating the corresponding 1,1'-disubstituted-1,1',4,4'-tetrahydro-4,4'-bipyridyl with an organic compound which has a redox potential in water more positive than -1.48 volts as compared with the saturated calomel electrode and which accepts a hydride ion removed from said tetrahydrobipyridyl to form an unstable anion which under the conditions of the reaction has a redox potential more negative than -0.45 volts as compared with the saturated calomel electrode, and subsequently oxidizing the resulting interaction product containing the said dihydrobipyridyl with an oxidizing agent selected from oxygen and an oxidizing agent which has a redox potential in water more positive than -0.50 volt as compared with the saturated calomel electrode.

2. A process according to claim 1 wherein the treatment is carried out in a solvent for the tetrahydrobipyridyl.

3. A process according to claim 2 wherein the solvent is an organic solvent.

4. A process according to claim 2 wherein the solvent is also a solvent for the oxidising agent.

5. A process according to claim 2 wherein the solvent is a hydrocarbon.

6. A process according to claim 5 wherein the solvent is an aromatic hydrocarbon.

7. A process according to claim 1 wherein the treatment is carried out at a temperature of from 0° to 200°C.

8. A process according to claim 7 wherein the temperature is from 50° to 120°C.

9. A process according to claim 1 wherein the tetrahydrobipyridyl is employed as a solution in which its concentration is about 0.5 mole per litre.

10. A process according to claim 1 wherein the organic compound is employed as a solution in which its concentration is about 0.5 mole per litre.

11. A process according to claim 1 wherein the molar ratio of the organic compound to the tetrahydrobipyridyl is at least 1:1.

12. A process according to claim 1 wherein oxidation of the interaction product is effected by means of oxygen.

13. A process according to claim 1 wherein oxidation of the interaction product is effected by means of an oxidising agent which has a redox potential in water more positiive than —0.50 volt as compared with the saturated calomel electrode.

14. A process according to claim 1 wherein the organic compound is a monoketone.

15. A process according to claim 1 wherein the organic compound is a diketone.

16. A process according to claim 1 wherein the organic compound is an olefine.

17. A process according to claim 1 wherein the organic compound is a heterocyclic compound containing two hetero atoms.

18. A process according to claim 17 wherein the heterocyclic compound contains two nitrogen atoms.

19. A process according to claim 18 wherein the heterocyclic compound is phenazine.

* * * * *